(12) United States Patent
Warren

(10) Patent No.: US 9,261,219 B2
(45) Date of Patent: Feb. 16, 2016

(54) METHOD OF INSTALLING AND CURING A LINER IN A SEWER PIPE

(71) Applicant: Liqui-Force Sewer Services, Inc., Kingsville (CA)

(72) Inventor: Darcy Warren, Leamington (CA)

(73) Assignee: Liqui-Force Sewer Services, Inc., Kingsville, Ontario (CA)

( * ) Notice: Subject to any disclaimer, the term of this patent is extended or adjusted under 35 U.S.C. 154(b) by 0 days.

(21) Appl. No.: 14/327,609

(22) Filed: Jul. 10, 2014

(65) Prior Publication Data

US 2015/0013815 A1 Jan. 15, 2015

Related U.S. Application Data

(60) Provisional application No. 61/845,593, filed on Jul. 12, 2013.

(51) Int. Cl.
*F16L 55/16* (2006.01)
*F16L 55/165* (2006.01)

(52) U.S. Cl.
CPC ......... *F16L 55/1654* (2013.01); *F16L 55/1656* (2013.01)

(58) Field of Classification Search
CPC . B29C 63/0069; B29C 35/04; F16L 55/1651; F16L 55/1654
USPC ............ 138/98, 97; 156/287, 294; 405/184.2, 405/150.1; 264/516, 557, 573, 269
See application file for complete search history.

(56) References Cited

U.S. PATENT DOCUMENTS

| | | | | | |
|---|---|---|---|---|---|
| 4,064,211 | A | * | 12/1977 | Wood | B29C 63/0069 138/140 |
| 5,225,121 | A | * | 7/1993 | Yokoshima | F16L 55/1654 138/97 |
| 5,816,293 | A | * | 10/1998 | Kiest, Jr. | B29C 63/0095 138/97 |
| 5,927,341 | A | * | 7/1999 | Taylor | B29C 63/28 138/97 |
| 6,039,079 | A | * | 3/2000 | Kiest, Jr. | B29C 63/36 138/97 |
| 6,050,300 | A | * | 4/2000 | Schwert | B29C 63/36 138/97 |
| 6,354,330 | B1 | * | 3/2002 | Wood | B29C 63/0069 138/97 |
| 6,682,668 | B1 | * | 1/2004 | Driver | B29C 63/36 138/97 |
| 6,969,216 | B2 | * | 11/2005 | Driver | F16L 55/1651 138/97 |

* cited by examiner

*Primary Examiner* — Patrick F Brinson
(74) *Attorney, Agent, or Firm* — Carlson, Gaskey & Olds, P.C.

(57) ABSTRACT

A system for installing and curing a cured in place pipe liner includes a bladder with a terminal end and an originating end that is inflatable by an inflating medium and a return conduit within the bladder that extends from the terminal end to the originating end of the bladder. The return conduit includes an opening near the terminal end for passage of the inflating medium between the return conduit and an interior cavity of the bladder. A control valve is disposed on the return conduit and is configured to control flow of the bladder inflating medium through the return conduit.

14 Claims, 3 Drawing Sheets

METHOD OF INSTALLING AND CURING A LINER IN A SEWER PIPE

CROSS REFERENCE TO RELATED APPLICATION

This application claims priority to U.S. Provisional Application No. 61/845,593 filed on Jul. 12, 2013.

BACKGROUND

This disclosure generally relates to a method of installing a cured in place pipe. Cured in place pipe (CIPP) method utilizes a resin impregnated liner that is installed within a sewer pipe. Fluid pressure holds the liner against the interior of the old sewer pipe until the resin is cured. Once cured, the liner forms a new pipe within the old pipe. Installation of the liners within laterals pipelines is complicated by the difficulty in accessing the lateral sewer pipe.

SUMMARY

A system for installing and curing a cured in place pipe liner is disclosed and includes a bladder with a terminal end and an originating end that is inflatable by an inflating medium and a return conduit within the bladder that extends from the terminal end to the originating end of the bladder. The return conduit includes an opening near the terminal end for passage of the inflating medium between the return conduit and an interior cavity of the bladder. A control valve is disposed on the return conduit and is configured to control flow of the bladder inflating medium through the return conduit.

A method of installing a cured in place pipe liner is further disclosed and includes the step of inflating a bladder with an inflating medium for pressing a pipe liner against interior surface of pipeline. The method further includes the step of circulating the inflating medium through a conduit disposed within the bladder where the conduit includes an open end spaced apart from an originating end of the bladder.

Although the different examples have the specific components shown in the illustrations, embodiments of this disclosure are not limited to those particular combinations. It is possible to use some of the components or features from one of the examples in combination with features or components from another one of the examples.

These and other features disclosed herein can be best understood from the following specification and drawings, the following of which is a brief description.

DETAILED DESCRIPTION

Figure 1:
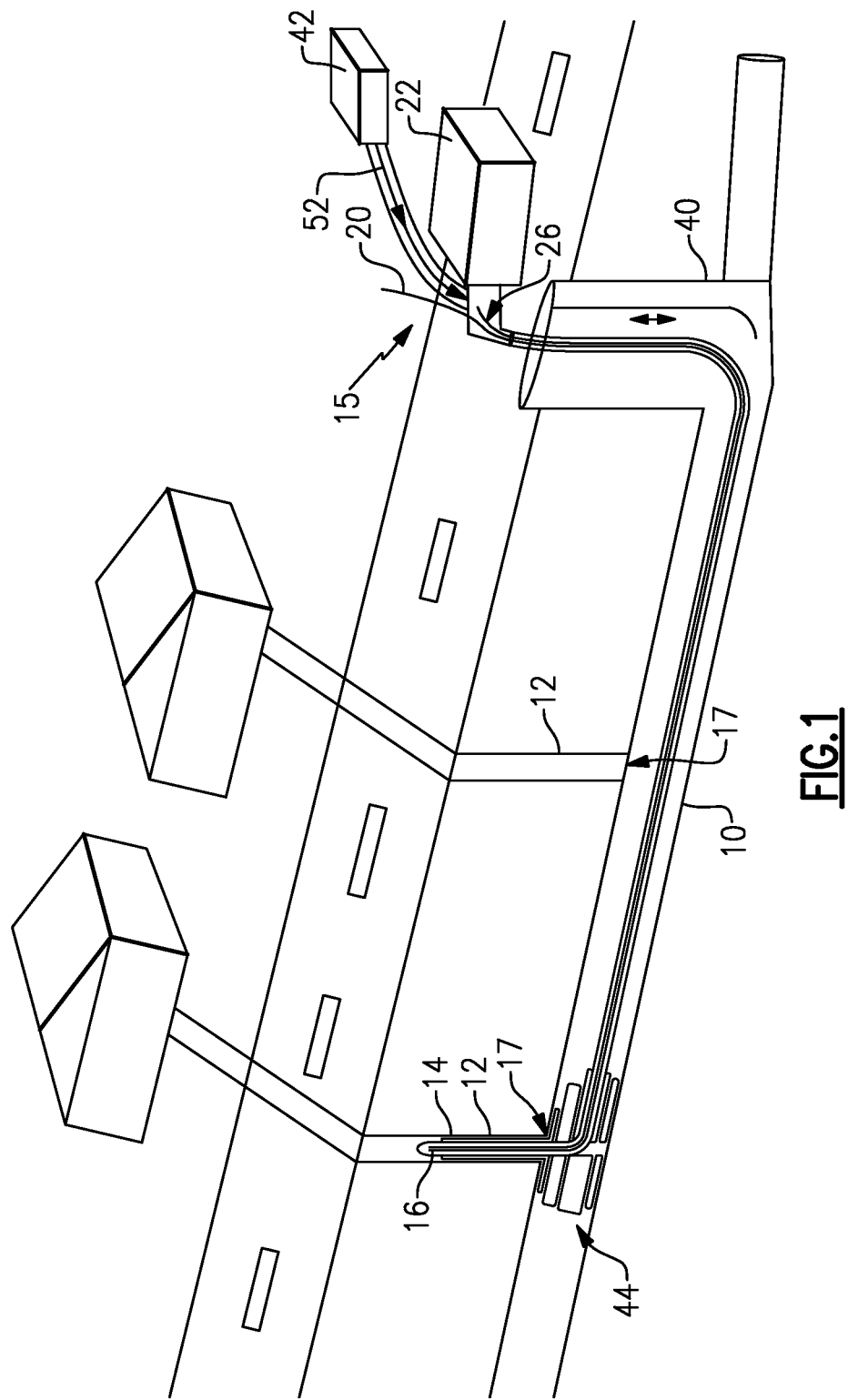
FIG. 1 is a schematic representation of a sewer system including a main sewer pipe and several lateral sewer pipes.

Referring to FIG. 1, a sewer system includes a main sewer pipe 10 and a number of lateral sewer pipes 12 that extend from buildings or homes and feed into the main sewer pipe 10. In many instances it is required to repair portions of the main sewer pipe 10 and the lateral sewer pipes 12 due to buildup of debris or other problems associated with the age of the sewer system.

Traditional sewer pipe repair methods require digging up and replacing the damaged sewer pipe. An alternative to digging includes the use of a cured in place pipe (CIPP) repair. A CIPP repair utilizes a liner soaked in a curable resin that is installed within the existing pipe structures. The resin soaked liner is installed within the sewer pipe and forces outwardly against the inner surface of the existing sewer pipe and held until cured. Once cured the felt soaked pipe becomes a pipe within the older pipe, thereby providing the repair. This procedure can be accomplished without digging or excavating the sewer pipe and is therefore preferable over traditional methods.

Installation of a resin soaked liner within a sewer pipe requires alignment a distance away from access points. Prior to installation of the liner, the sewer is cleaned and inspected. Repair and lining of a lateral sewer pipe requires the additional step of locating the proper opening from an access point such as a manhole some distance away. Additionally, a tube is dug down to the lateral pipe between the main and the home. The tube referred to as a clean out tube and is utilized to aid in preparation of the lateral sewer pipe prior to lining.

During installation of a cured in place pipe flow through the sewer pipe may be blocked and disrupted. Blocking the flow through the sewer pipe results in a disruption in service that is not desirable and therefore the duration of a required blockage is sought to be minimized. The curing time of a resin impregnated liner is a major factor in the amount of time that a pipe must be blocked to facilitate a repair. As appreciated, while the liner is curing, fluid flow through the lateral may not be possible or require temporary bypass devices that further complicate installation.

An example system 15 and method of installing and curing a pipe liner 14 is schematically shown in FIG. 1. The system 15 includes a pressurized air supply 42 and a steam generator 22. The air supply 42 is utilized to initially drive the bladder 16 into the sewer through an eversion process. An eversion process utilizes the air pressure to turn the bladder inside out and forward within the sewer pipe along with the pipe liner 14. Prior to placement within the sewer, the pipe liner 14 is impregnated with a curable resin and installed onto the bladder 16. Air pressure from the air supply 42 is then utilized to evert the bladder and move the pipe liner 14 to the desired location within the sewer.

Figure 2:
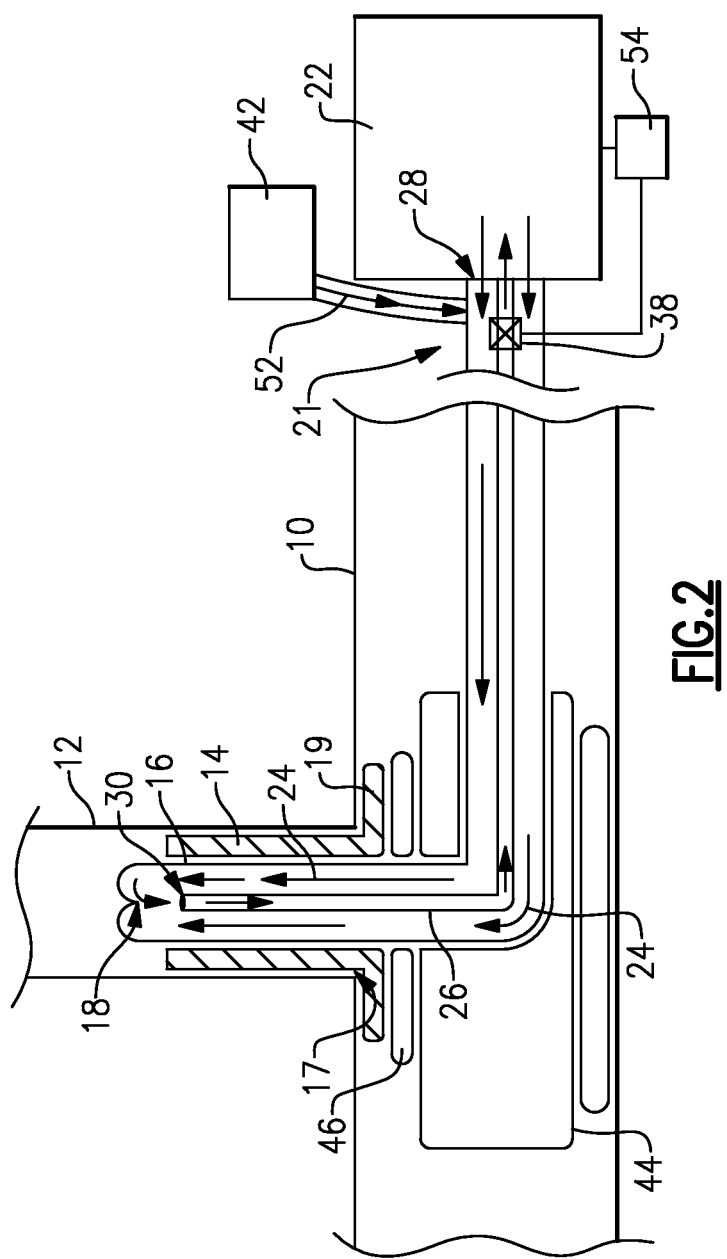
FIG. 2 is a schematic view of an example steam curing system.
Figure 4:
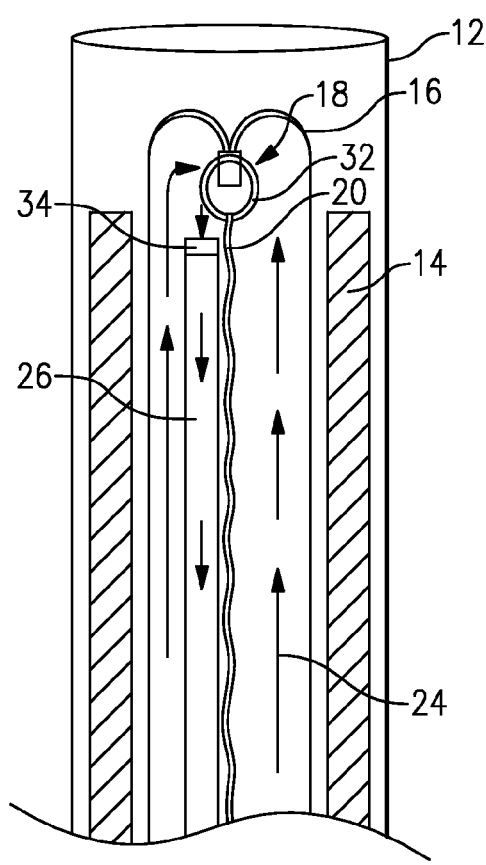
FIG. 4 is a view of an end of liner and bladder assembly illustrating flow through the bladder to facilitate curing.

Referring to FIGS. 2 and 4 with continued reference to FIG. 1, installation of the pipe liner 14 within the lateral sewer pipe 12 includes the use of a launcher assembly 44. The launcher assembly 44 defines a passage for the pipe liner 14 and bladder 16 into the lateral sewer pipe 12. The example launcher assembly 44 includes a second inflatable member 46 to secure the launcher assembly 44 in place within the main sewer pipe 10 and to also force a flange portion 19 of the liner 14 against an inner surface of the main sewer pipe 10 at a junction between the main sewer pipe 10 and the lateral sewer pipe 12 around the lateral opening 17. Once the liner 14 is installed into a desired position, steam indicated at 24 is communicated into the bladder 16.

The bladder 16 includes a terminal end 18 that is bound to prevent leakage and includes a connector 32 (FIG. 4). The connector 32 provides not only the terminal end connection, but also provides a connection point for a rope 20. The rope 20 is provided to enable removal of the bladder 16 once the liner 14 is cured. Once the liner 14 is cured, the bladder 16 is deflated and the rope 20 used to remove the bladder 16 from the lateral 12 and the sewer.

Curing of the liner 14 takes a defined length of time that varies with temperature and other environmental conditions. The curing process is accelerated by applying heat in the form of steam 24. The distance and accessibility of the lateral sewer pipe 12 complicates the ability to apply heat to the remote end of the lateral liner 14. Steam is flowed through the bladder 16 apply heat and speed the curing process.

Steam 24 can only flow to the terminal ends of the bladder 16 if air pressure within the bladder 16 can be displaced. In other words, after inflation of the bladder 16, air is maintained within the bladder 16 and prevents the circulation of steam or air to the distant ends of the liner 14. It is not desirable to provide an exhaust opening at the bladder end 18 that allows for the air and steam to pass out of the bladder and up through the lateral sewer pipe.

Accordingly, the example system 15 includes a return conduit or line 26 that defines a return passage for air and steam such that air and steam are exhausted back out the originating end of the bladder 16. The return line 26 includes an opening attached to the connector 32 to provide a return path for steam and air utilized to install and cure the liner 14. Accordingly, steam and/or heated air can be circulated through the bladder 16 to speed curing of the liner 14.

A control valve 38 is provided on the return line 26 near the originating end 21 to control flow through the return line 26. By controlling flow through the return line 26, the temperature at the terminal end 18 of the bladder 16 can be controlled and managed. The flow of steam through the bladder 16 generates heat and enables temperature control that in turn enables tailoring of the curing process to conditions encountered during installation.

Figure 3:
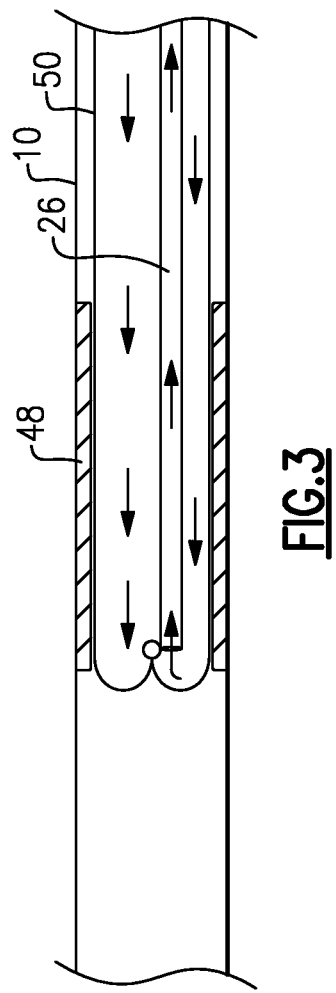
FIG. 3 is a schematic view of a main sewer liner and bladder assembly.

Referring to FIG. 3, a liner 48 for installation within the main sewer pipe 10 is schematically shown and will also benefit from the use of return line 26 that enables the circulation of heated air and steam to accelerate curing of the liner 48, and specifically the resin impregnated portions of the main liner 48.

Figure 5:
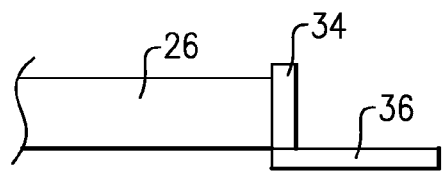
FIG. 5 is a side view of an example return line coupling.
Figure 6:
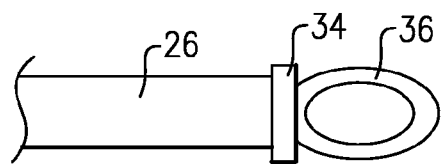
FIG. 6 is a top view of the example return line coupling.

Referring to FIGS. 4 and 5 with continued reference to FIGS. 1 and 2, the return line 26 includes a coupling 34 with a connector structure 36 enabling attachment to the connector 32 at the end of the bladder 16. The return line 26 comprises a rigid hose that defines a passageway from the terminal end 18 of the bladder 16 back to the originating end 21 of the bladder 16 near the steam generator 22.

Referring back to FIGS. 1 and 2, an example installation of a liner 16 into a lateral sewer pipe 12 begins by inserting the launcher 44 within the main sewer 10 and aligning the launcher 44 with the opening 17 in the main sewer pipe 10 corresponding to the lateral sewer pipe 12. The inflatable member 46 is inflated to hold the launcher 44 and the liner 16 in place.

The liner 14 is than installed within the lateral sewer pipe 12 by inflating the bladder 16 with air 52 from the air supply 42 to extend the liner 14 up into the liner. Note that steam or other inflating medium such as water at a required pressure may also be utilized to drive the bladder 16 and liner 14 into the lateral 12. The process of driving the liner 14 into the lateral 12 using the bladder and air pressure is referred to as an inversion process. Prior to installation, both the rope 20 and return line 26 are attached to the connector 32 at the end 18 of the bladder 16. The bladder 16 may then be inflated to drive the liner 14 into place within the lateral 12.

The return line 26 is closed off during the inversion process to provide for the pressure required to drive the bladder 16 into place. The control valve 38 is utilized for this purpose and is illustrated in an accessible location proximate the steam generator 22. As appreciated, the control valve 38 may be provided in any location along the return line 26 as desired and may be operated remotely by a controller 54.

Once the bladder 16 and liner 14 are in place within the lateral sewer 12, steam 24 produced by the steam generator 22 is communicated through the bladder 16. Flow of the steam through an inlet 28 is allowed by opening of the control valve 38 to provide for exhausting of air/steam through the return opening 30. The passage provided by the return line 26 provides for the circulation of steam and air through the bladder 16. In this example steam 24 is circulated through the bladder 16 to cure the liner 14 quickly without exhausting steam into the lateral. The entire steam circuit through the bladder 16 and the return line 26 is a closed circuit that provides for significant control of the curing process. As appreciated, the speed and flow rate of steam fed into the bladder 16 can be controlled by the control valve 38 at a single location to provide the curing rates desired for a good and well cured liner installation.

Once the liner 14 is fully cured, the bladder 16 is deflated. The return line 26 aids in exhausting air from the bladder 16 by providing an additional conduit and path for air and steam to be exhausted form the bladder 16. Moreover, because the return line 26 is a rigid conduit, it maintains the passage for exhausting of air while the bladder 16 may collapse in on itself. Moreover, the return line 26, itself, may be utilized to withdraw the bladder 16 from the sewer pipe.

Accordingly, the example system 15 and method provides for the circulation of steam and air through a bladder to speed liner curing without exhausting to the outside environment. Moreover, the return path provided by the return conduits provides for additional control over the flow rate of steam and air input into the bladder to aid in the curing process.

Although a preferred embodiment of this invention has been disclosed, a worker of ordinary skill in this art would recognize that certain modifications would come within the scope of this invention. For that reason, the following claims should be studied to determine the true scope and content of this invention.

What is claimed is:

1. A system for installing and curing a cured in place pipe liner comprising:
    a bladder including a terminal end and an originating end, wherein the bladder is inflatable by an inflating medium, wherein the cured in place pipe liner includes a portion for sealing an interface between a lateral pipeline transverse to a main pipeline;
    a return conduit within the bladder extending from the terminal end to the originating end of the bladder and including an opening near the terminal end for passage of the inflating medium between the return conduit and an interior cavity of the bladder;
    a steam generator communicating steam into the bladder once inflated;
    a control valve configured to control flow of the bladder inflating medium through the return conduit, wherein the control valve further controls a flow of steam to control a temperature within the bladder during curing of the cured in place pipe liner.

2. The system as recited in claim 1, including a connector securing the return conduit near the terminal end of the bladder.

3. The system as recited in claim 1, wherein the originating end of the bladder includes an opening for receiving the inflating medium.

4. The system as recited in claim 3, wherein the inflating medium flows from the originating end of the bladder toward the terminal end, then through the opening of the return conduit and through the return conduit back toward the originating end of the bladder.

5. The system as recited in claim 4, wherein the return conduit extends out the originating end of the bladder.

6. The system as recited in claim 1, wherein the inflating medium comprises one of steam, air and water.

7. The system as recited in claim 1, wherein the inflating medium comprises steam.

8. The system as recited in claim 1, wherein the bladder is inflatable for forcing a cured in place pipe liner against interior walls of a pipeline.

9. A method of installing a cured in place pipe liner comprising:
- inflating a bladder with an inflating medium for pressing a pipe liner against interior surface of pipeline, the bladder including a closed terminal end and the pipe liner including a portion extending into a lateral pipeline transverse to a main pipeline;
- circulating the inflating medium through a conduit disposed within the bladder, wherein the conduit includes an open end near the terminal end of the bladder; and
- controlling a temperature of during curing of the pipe liner near the terminal end by controlling a flow of steam into the bladder through the conduit with a control valve actuatable from outside the bladder.

10. The method as recited in claim 9, including inflating the bladder with steam and circulating the steam through the conduit and out of the bladder.

11. The method as recited in claim 9, including attaching the conduit to a terminal end of the bladder and inverting the bladder into a pipe with the conduit.

12. The method as recited in claim 11, including inverting the pipe liner with the bladder.

13. The method as recited in claim 9, including injecting the inflating medium into the bladder around the conduit and exhausting the inflating medium from the bladder through the conduit.

14. The method as recited in claim 9, including maintaining the temperature within the bladder within a desired range by circulating the inflating medium through the bladder and conduit.

* * * * *